(12) United States Patent
Kawase et al.

(10) Patent No.: US 6,906,748 B1
(45) Date of Patent: Jun. 14, 2005

(54) ELECTRONIC CAMERA

(75) Inventors: Dai Kawase, Hino (JP); Masayu Higuchi, Hachioji (JP)

(73) Assignee: Olympus Optical Co., Ltd., Tokyo (JP)

(*) Notice: Subject to any disclaimer, the term of this patent is extended or adjusted under 35 U.S.C. 154(b) by 985 days.

(21) Appl. No.: 09/643,800

(22) Filed: Aug. 22, 2000

(30) Foreign Application Priority Data

| Aug. 24, 1999 | (JP) | 11-237058 |
| Aug. 24, 1999 | (JP) | 11-237059 |
| Aug. 24, 1999 | (JP) | 11-237060 |
| Aug. 24, 1999 | (JP) | 11-237061 |
| Aug. 24, 1999 | (JP) | 11-237062 |
| Aug. 24, 1999 | (JP) | 11-237063 |

(51) Int. Cl.$^7$ .............................. H04N 9/64
(52) U.S. Cl. ............... 348/246; 348/247; 382/299
(58) Field of Search ............... 348/246, 264, 348/247, 220.1; 382/299, 300, 298

(56) References Cited

U.S. PATENT DOCUMENTS

| 6,031,569 A | * | 2/2000 | Nobuoka et al. | 348/220.1 |
| 6,456,324 B1 | * | 9/2002 | Yamada et al. | 348/219.1 |
| 6,753,910 B1 | * | 6/2004 | Ogata et al. | 348/235 |
| 2001/0010558 A1 | * | 8/2001 | Yasuda | 348/350 |
| 2001/0015760 A1 | * | 8/2001 | Fellegara et al. | 348/333.01 |
| 2001/0043760 A1 | * | 11/2001 | Hieda et al. | 382/300 |
| 2003/0147634 A1 | * | 8/2003 | Takezawa et al. | 386/117 |

FOREIGN PATENT DOCUMENTS

| JP | 1-155393 A | 6/1989 |
| JP | 01-155393 A | 6/1989 |
| JP | 02-226977 | 9/1990 |
| JP | 06-177706 | 6/1994 |
| JP | 07-046610 A | 2/1995 |
| JP | 08-172636 A | 7/1996 |
| JP | 08-275061 | 10/1996 |
| JP | 09-163294 A | 6/1997 |
| JP | 10-108121 | 4/1998 |
| JP | 10-133618 A | 5/1998 |
| JP | 10-155157 A | 6/1998 |
| JP | 10-191392 | 7/1998 |
| JP | 10-248069 | 9/1998 |
| JP | 10-341407 | 12/1998 |
| JP | 11-053530 | 2/1999 |
| JP | 2000-232655 A | 8/2000 |
| JP | 2001-061058 A | 3/2001 |

* cited by examiner

Primary Examiner—Wendy R. Garber
Assistant Examiner—Nelson D. Hernandez
(74) Attorney, Agent, or Firm—Frishauf, Holtz, Goodman & Chick, P.C.

(57) ABSTRACT

An interpolation calculation circuit for improving the image quality for recording and display is provided. The interpolation calculation circuit interpolates a necessary pixel on the basis of interpolation calculation (cubic interpolation processing) by an approximate expression of an interpolation coefficient of at least 3rd-order. This cubic interpolation processing is applied to basic processing of an electronic camera, i.e., 3-CCD processing, format conversion, and image enlargement/reduction. In consideration of the operation load on the electronic camera, cubic interpolation processing is performed in accordance with the image sensing mode or the like only when it is necessary, thereby controlling whether execution of interpolation processing is enabled/disabled.

16 Claims, 14 Drawing Sheets

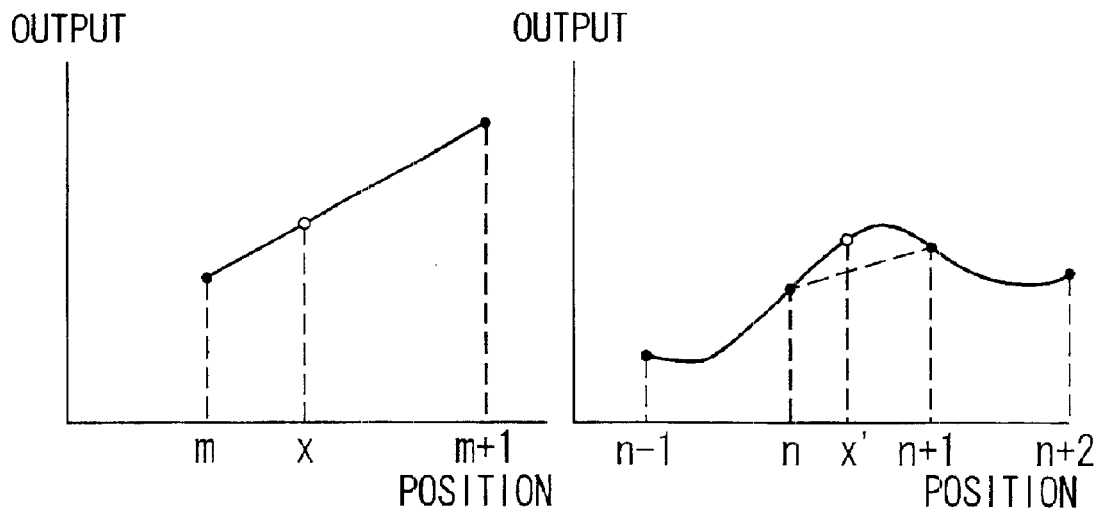
FIG. 2A (PRIOR ART)
FIG. 2B
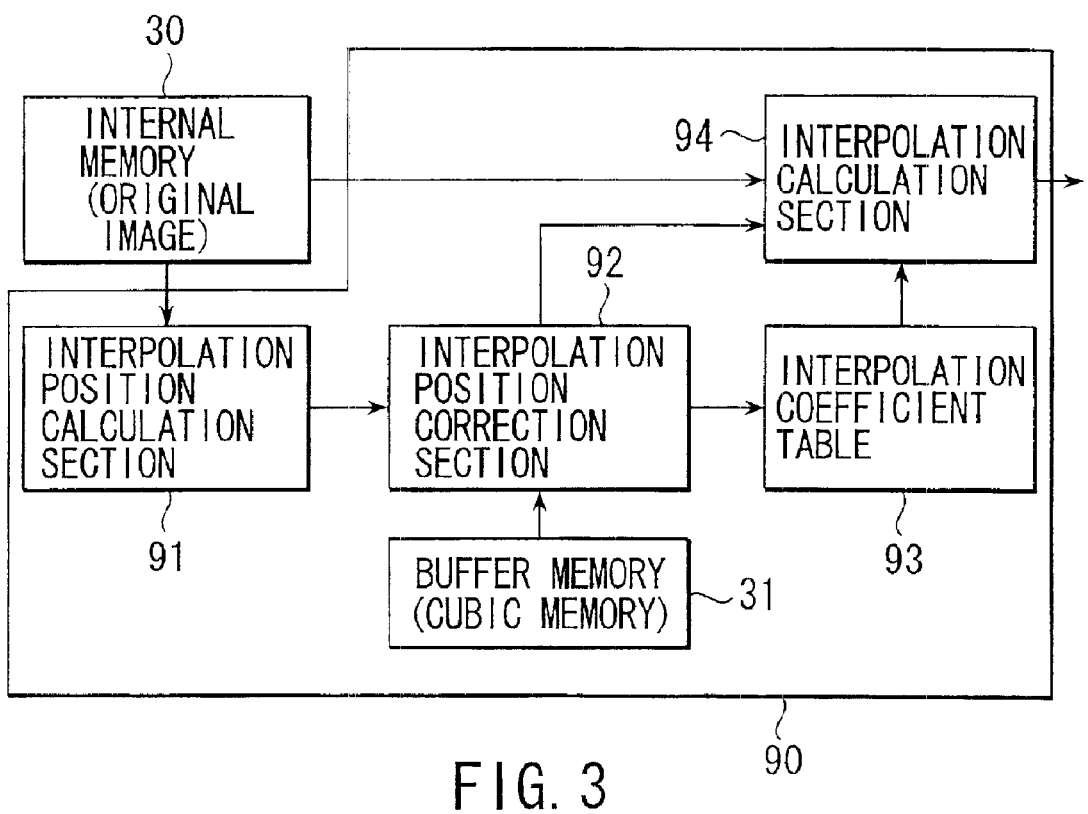
FIG. 3

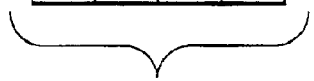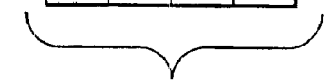
FIG. 8A    FIG. 8B    FIG. 8C
FIG. 9

| IMAGE SENSING MODE (DRIVE) | | RECORDING IMAGE QUALITY | | |
|---|---|---|---|---|
| | | SQ | HQ | SHQ |
| MOVING IMAGE SENSING MODE | (STANDARD) | — | — | — |
| | (STOP MOTION) | — | — | — |
| STILL IMAGE SENSING MODE | (SINGLE IMAGE SENSING) | ○ | ○ | — |
| | (CONTINUOUS IMAGE SENSING) | — | ○ | — |
| MOVING IMAGE & STILL IMAGE SENSING MODE | | — | ○ | — |

ELECTRONIC CAMERA

CROSS-REFERENCE TO RELATED APPLICATIONS

This application is based upon and claims the benefit of priority from the prior Japanese Patent Applications No. 11-237058, filed Aug. 24, 1999; No. 11-237059, filed Aug. 24, 1999; No. 11-237060, filed Aug. 24, 1999; No. 11-237061, filed Aug. 24, 1999; No. 11-237062, filed Aug. 24, 1999; and No. 11-237063, filed Aug. 24, 1999, the entire contents of which are incorporated herein by reference.

BACKGROUND OF THE INVENTION

The present invention relates to an electronic camera which electronically senses an object image and displays and records obtained image information.

In an electronic camera, an object image obtained through an image sensing lens system is photoelectrically converted by a CCD (solid-state image sensing element), sensed by an image sensing circuit, and then converted into a digital image signal by an A/D converter. This digital image signal is subjected to various image processing operations and then displayed on an LCD and recorded on a compact recording medium.

For example, to record an image, the image information of an object image is supplied to an image compression/expansion circuit of, e.g., JPEG (Joint Photographic coding Experts Group) scheme. The JPEG scheme is known well as one of data compression schemes for color still images. This scheme omits specific image information on the basis of the human visual characteristic to reduce the image storage capacity. Image information compressed by the compression/expansion circuit is recorded on a compact recording medium through a predetermined interface.

For such an electronic camera, improvement in image quality is an important subject, and extensive research and development have been made along with an increase in density of solid-image sensing elements and improvement in ability of arithmetic processors.

To improve the image quality, for example, a new dedicated processing system may be added to an electronic camera.

However, popular electronic cameras must meet a very strict cost requirement. Portability is also important. It is not effective to add a large-scale dedicated image processing unit to an electronic camera even if it improves the image quality. This is one of system restrictions according to the characteristic features of an electronic camera in improving it.

Accordingly, this restriction makes it hard to apply, known usual technologies in other technical fields to the electronic camera.

Specifically, it is hard to apply, a new image processing technique in which a pixel at a point is three-dimensionally calculated and interpolated on the basis of neighboring pixels at a plurality of points to the electronic camera. According to image processing of this type, for example, a smooth visual image can be obtained, and the image quality can be greatly improved. This image processing technique is known in, e.g., Jpn. Pat. Appln. KOKAI Publication No. 10-191392. However, the technique disclosed in this prior art assumes use of a special processor called a linear-array-type multi-parallel processor and is not related to application of the image processing technique to an electronic camera.

Demand has arisen for application of such a new image processing technique to an electronic camera under the above-described system restriction.

Conventionally, several techniques have been used to improve the image quality of an electronic camera.

One technique is disclosed in Jpn. Pat. Appln. KOKAI Publication No. 10-248069. In this technique, to avoid a false signal at an edge portion in pixel interpolation, two images are generated by spatial pixel shift, and a synthesized image thereof is obtained. However, this prior art is different from the new image processing method of three-dimensionally calculating and interpolating a pixel at one point on the basis of neighboring pixels at a plurality of points. This prior art does not disclose a combination of the two techniques.

Another technique is disclosed in Jpn. Pat. Appln. KOKAI Publication No. 10-108121. This technique obtains a high-quality still image from a recorded moving image in an electronic camera capable of recording/displaying not only a still image but also a moving image. This prior art is also different from the above-described new image processing method of three-dimensionally calculating and interpolating a pixel.

BRIEF SUMMARY OF THE INVENTION

The present invention has been made in consideration of the above-described situation, and has as its object to provide an electronic camera capable of processing a high-quality image with a simple arrangement without any dedicated hardware.

According to the present invention, there is provided an electronic camera comprising: an image sensing unit for electronically sensing an object image and outputting image data of the object image; a memory unit for storing the image data output from the image sensing unit; an image processing unit for performing predetermined image processing based on the image data stored in the memory unit; an interpolation calculation circuit for interpolating a pixel whose data is not present in the image data after image processing by the image processing unit by interpolation calculation based on an approximate expression including a polynomial of at least 3rd-order, and writing the image data after interpolation in the memory unit; a display unit for displaying the image data after interpolation; and a recording unit for recording the image data after interpolation on a recording medium.

According to this electronic camera, high-quality image processing with a simple arrangement without adding dedicated hardware can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A is a graph showing one-dimensional interpolation models so as to explain an interpolation processing according to the prior art;

FIG. 2B is a graph showing one-dimensional interpolation models so as to explain the basic concept of cubic interpolation processing;

FIG. 3 is a block diagram showing the arrangement of an interpolation calculation circuit;

FIG. 6A is a view showing a single-CCD as a processing source so as to explain pseudo 3-CCD processing by an RGB 3-CCD processing section;

FIG. 6B is a view showing three pixel planes as a result of pseudo 3-CCD processing so as to explain pseudo 3-CCD processing by the RGB 3-CCD processing section;

FIG. 6C is a view showing pixel planes after Y-C conversion so as to explain pseudo 3-CCD processing by the RGB 3-CCD processing section;

FIG. 7A is a view showing interpolation in an R (red) plane so as to explain an interpolation method for each of R, G, and B colors;

FIG. 7B is a view showing interpolation in a G (green) plane so as to explain the interpolation method for each of R, G, and B colors;

FIG. 7C is a view showing interpolation in a B (blue) plane so as to explain the interpolation method for each of R, G, and B colors;

FIG. 8A is a view showing interpolation in the R (red) plane so as to explain another interpolation method for each of R, G, and B;

FIG. 8B is a view showing interpolation in the G (green) plane so as to explain the interpolation method for each of R, G, and B in FIG. BA;

FIG. 8C is a view showing interpolation in the B (blue) plane so as to explain the interpolation method for each of R, G, and B in FIG. BA;

FIG. 9 is a view for explaining still another interpolation method for the G (green) plane;

DETAILED DESCRIPTION OF THE INVENTION

An embodiment of the present invention will be described below with reference to the accompanying drawing.

Figure 1:
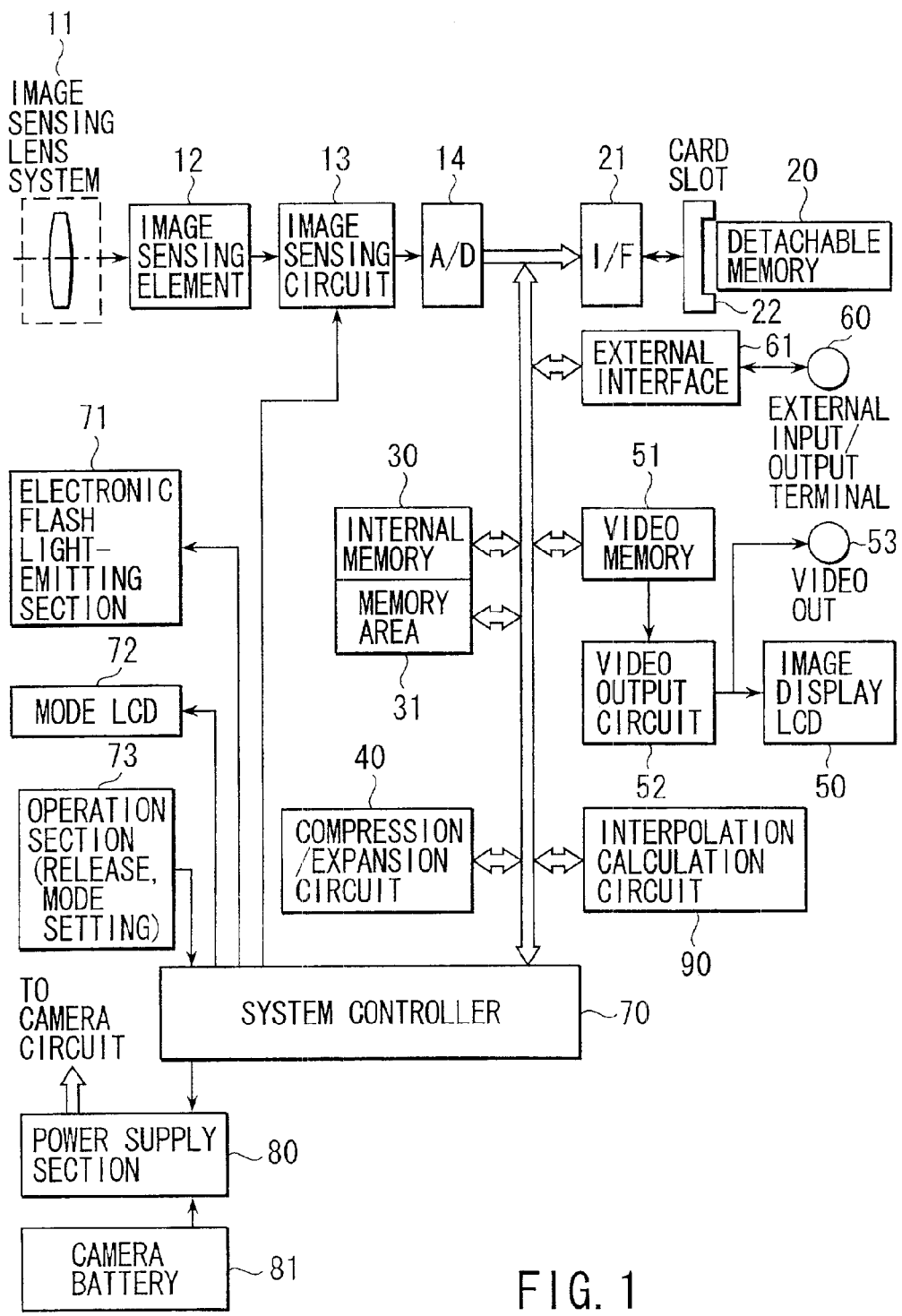
FIG. 1 is a schematic block diagram showing the system arrangement of an electronic camera according to an embodiment of the present invention.

FIG. 1 is a schematic block diagram showing the system arrangement of an electronic camera according to an embodiment of the present invention. The schematic arrangement of the electronic camera according to the present invention will be described with reference to FIG. 1.

An object image that has passed through an image sensing lens system 11 is converted into an electrical signal by an image sensing element 12. The electrical signal converted by the image sensing element 12 is converted into an analog image signal by an image sensing circuit 13 and then into a digital image signal by an A/D converter 14. This digital image signal is subjected to a series of image processing operations and then recorded in a detachable memory 20 as an external memory (e.g., a flash memory or smart medium) through an interface (I/F) 21. The detachable memory 20 is normally inserted into a card slot 22. The electronic camera also has an internal memory 30 (e.g., a RAM (Random Access Memory)) which operates at a high speed and is used as a buffer for temporarily storing various image data. In the present invention, the internal memory 30 has a memory area 31 for interpolation processing. This memory area 31 can be prepared independently of the internal memory 30 or incorporated in an interpolation calculation circuit (or IC).

A compression/expansion section 40 compresses the digital image signal or expands the compressed image signal.

The electronic camera normally has an LCD 50 (liquid crystal display device) for displaying an image. The LCD 50 is used to confirm an image recorded in the detachable memory 20 or display an image to be sensed. An image can be displayed on the LCD 50 by temporarily loading image information from the internal memory 30 to a video memory 51 and converting the image information into a video image by a video output circuit 52. The output from the video output circuit 52 can be output to an external display device as a video image through an external terminal 53 for video output.

A system controller 70 systematically controls the sections of the electronic camera. The detailed functions of the system controller 70 will be described later. The system controller 70 receives an input from an operation section 73 formed from a release button and senses an image in accordance with the operation of the release button, or requests an image processing circuit (not shown) to process an image. If the light amount in sensing an object is too small, the system controller 70 requests and controls an electronic flash light-emitting section 71 to turn on the electronic flash for image sensing. The system controller 70 also has an image sensing distance detection section (not shown) having a function of detecting the distance from the object. The operation section 73 can set various modes. The mode setting is displayed on a mode LCD 72.

An external interface (external I/F) 61 is connected to an external input/output terminal 60 to input/output data from/to an external device. The external input/output terminal 60 is connected to, e.g., a personal computer to transfer an image in the detachable memory 20 to the personal computer or receive image data from the personal computer.

The sections of the electronic camera are basically driven by a battery. Power supplied from a camera battery 81 through a power supply section 80 drives the sections of the camera. The camera battery 81 can be charged under the control of the power supply section 80.

The electronic camera of this embodiment has an interpolation calculation circuit 90 to improve the quality of sensed image. Cubic interpolation calculation processing implemented by this interpolation calculation circuit 90 is also called three-dimensional convolutional interpolation calculation processing and generally known as an interpolation processing method of obtaining a high-quality visual image. The present invention is not limited to cubic interpolation calculation processing and also incorporates interpolation calculation processing by an approximate expression using a higher-order polynomial of at least 3rd-order.

The basic concept of cubic interpolation processing will be described on the basis of a one-dimensional image.

FIGS. 2A and 2B are graphs showing one-dimensional interpolation models. Conventionally, linear interpolation of calculating an output value at a desired position using a line connecting two points is generally used, as shown in FIG. 2A. In this method, although only two points suffice as positions having known output values necessary for calculation, the output value obtained is merely the proportional average between the two points. For example, even when the maximum value or minimum value is present between the two points, it cannot be detected. In the present invention, to improve the interpolation accuracy, an output value at a desired position is obtained by an approximate expression using a multi-order polynomial of at least 3rd-order.

FIG. 2B shows an example in which the coefficients of a 3rd-order polynomial are obtained from values at four points, and an output is obtained by substituting position data to an approximate expression using the obtained 3rd-order polynomial. This interpolation by an approximate expression using a 3rd-order polynomial is also called "cubic interpolation". Referring to FIG. 2B, the coefficients of the 3rd-order polynomial are obtained from the output values at four positions (n−1), n, (n+1) and (n+2), the output value at a position x' is obtained from the 3rd-order polynomial, thereby obtaining an interpolation value at the desired position. If this processing is done using linear interpolation, the position (n+1) is obtained as the position having the maximum value. Hence, no accurate position can be obtained, unlike the present invention.

FIG. 3 is a block diagram showing the arrangement of the interpolation calculation circuit 90. The interpolation calculation circuit 90 comprises an interpolation position calculation section 91, interpolation position correction section 92, interpolation coefficient table 93, interpolation calculation section 94, and buffer memory 31. The functions of the interpolation position calculation section 91 to the interpolation calculation section 94 are controlled by the system controller 70. More specifically, the interpolation calculation circuit 90 performs the following operation.

Original image data from the internal memory 30 is input to the interpolation position calculation section 91 and interpolation calculation section 94. On the basis of the input data, the interpolation position calculation section 91 calculates, e.g., the interpolation position x' between the point n and the point (n+1). Next, on the basis of data from the buffer memory 31, the interpolation position correction section 92 corrects the interpolation position to a point closest to the point x', which is one of points that divide the section between the point n and the point (n+1) into, e.g., 16 equal parts. By correcting the interpolation position, the output at the corrected interpolation position can be calculated using the interpolation coefficient table 93 prepared in advance. Hence, the output value at the interpolation position can be calculated fast without any complex calculation. As for an error by correction of the interpolation position, the interpolation coefficients are given in the table, and therefore, it is impractical to excessively finely set interpolation positions because the data quantity of the table increases. Relatively finely, e.g., equally dividing a section into 16 portions suffices in terms of accuracy and is practical because the data quantity is not so large.

Figure 4:
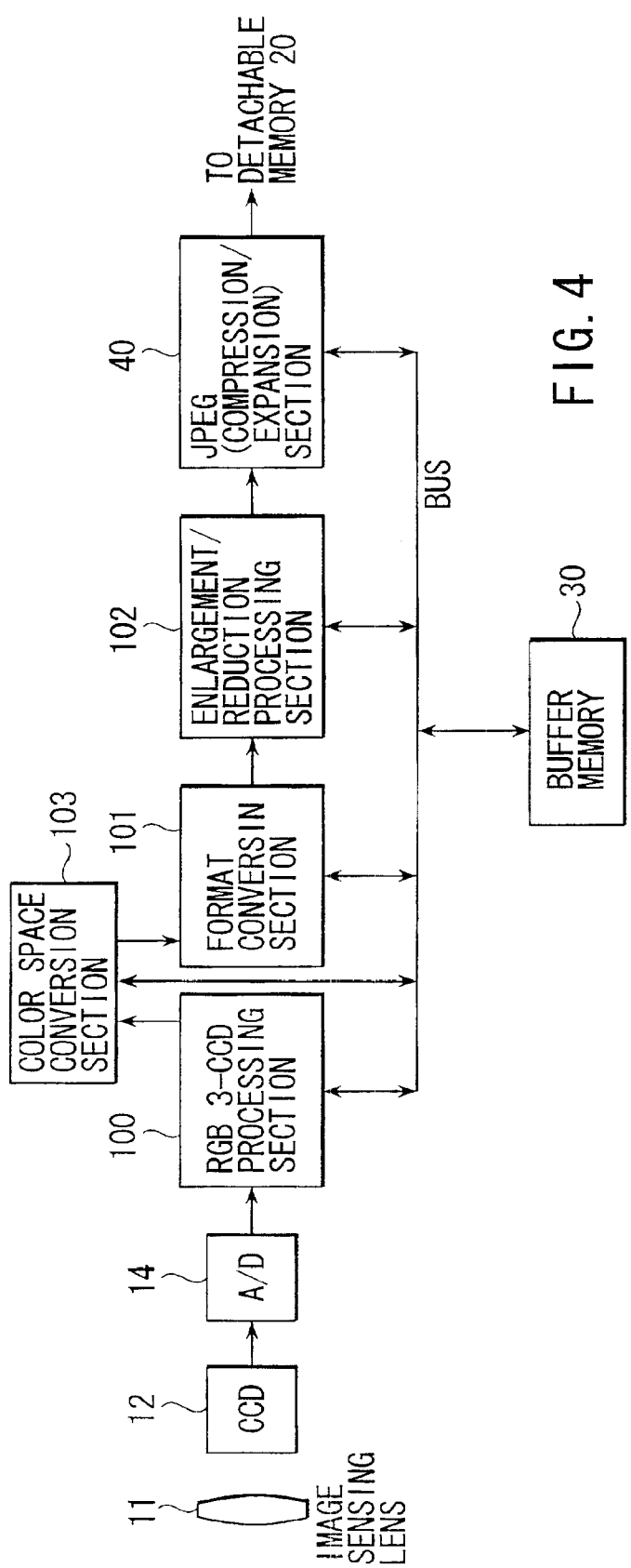
FIG. 4 is a block diagram showing the detailed arrangement of main parts of this embodiment.

FIG. 4 is a block diagram showing the detailed arrangement of the main part of this embodiment. As shown in FIG. 4, an RGB 3-CCD processing section 100, color space conversion section 103, format (sampling rate) conversion section 101, enlargement/reduction (resize) processing section 102, and compression/expansion (JPEG) section 40 are connected on the output side of the A/D converter 14. The RGB 3-CCD processing section 100, color space conversion section 103, format conversion section 101, enlargement/reduction processing section 102, and compression/expansion (JPEG) section 40 are connected to a common bus and can access, through this bus, an original image or cubic interpolation image recorded in the internal memory 30.

Cubic interpolation processing is used for at least some (all, in this embodiment) of 3-CCD processing of RGB data by the RGB 3-CCD processing section 100, image information format conversion processing by the format conversion section 101, and enlargement/reduction processing by the enlargement/reduction processing section 102.

[RGB 3-CCD Processing]

Figure 5:
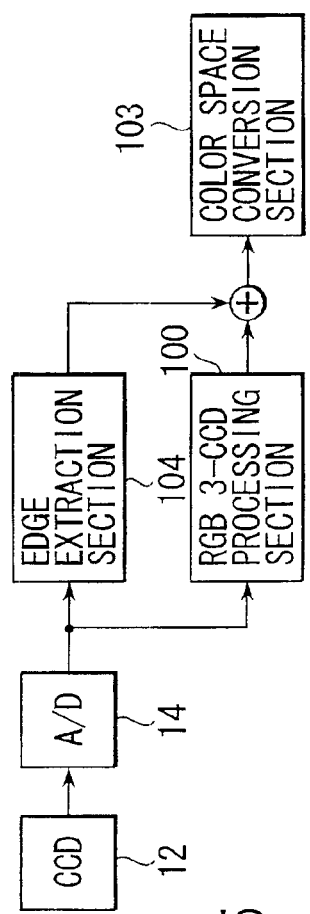
FIG. 5 is a schematic view showing the flow of pseudo 3-CCD processing.

FIG. 5 is a schematic view showing the flow of pseudo 3-CCD processing. The image sensing element 12 is made of a single image sensing element (single-CCD) to which an optical filter having a three-color coating of R, G, and B colors. The RGB 3-CCD processing section 100 separates pixels into the R, G, and B color components on the basis of the form of color coating of the image sensing element 12. Three, i.e., R, G, and B pixel planes are obtained from one pixel plane output from the image sensing element 12. This processing is called pseudo 3-CCD processing. This processing will be described later in detail.

As shown in FIG. 5, the image signal converted into a digital signal by the A/D converter 14 branches to two signals. One signal is used for edge extraction (104), and the other signal is used for 3-CCD processing. The signal representing the edge of the image is extracted from the broadband signal of the image. Pseudo 3-CCD processing is executed using the narrow-band signal of the image. The signal representing the extracted edge is synthesized with three image signals, and the synthesized signal is subjected to image processing by the color space conversion section 103 and the like. The G (green) signal containing many broadband components is used for edge extraction processing.

Figures 6A, 6B, 6C, 7A, 7B, 7C:
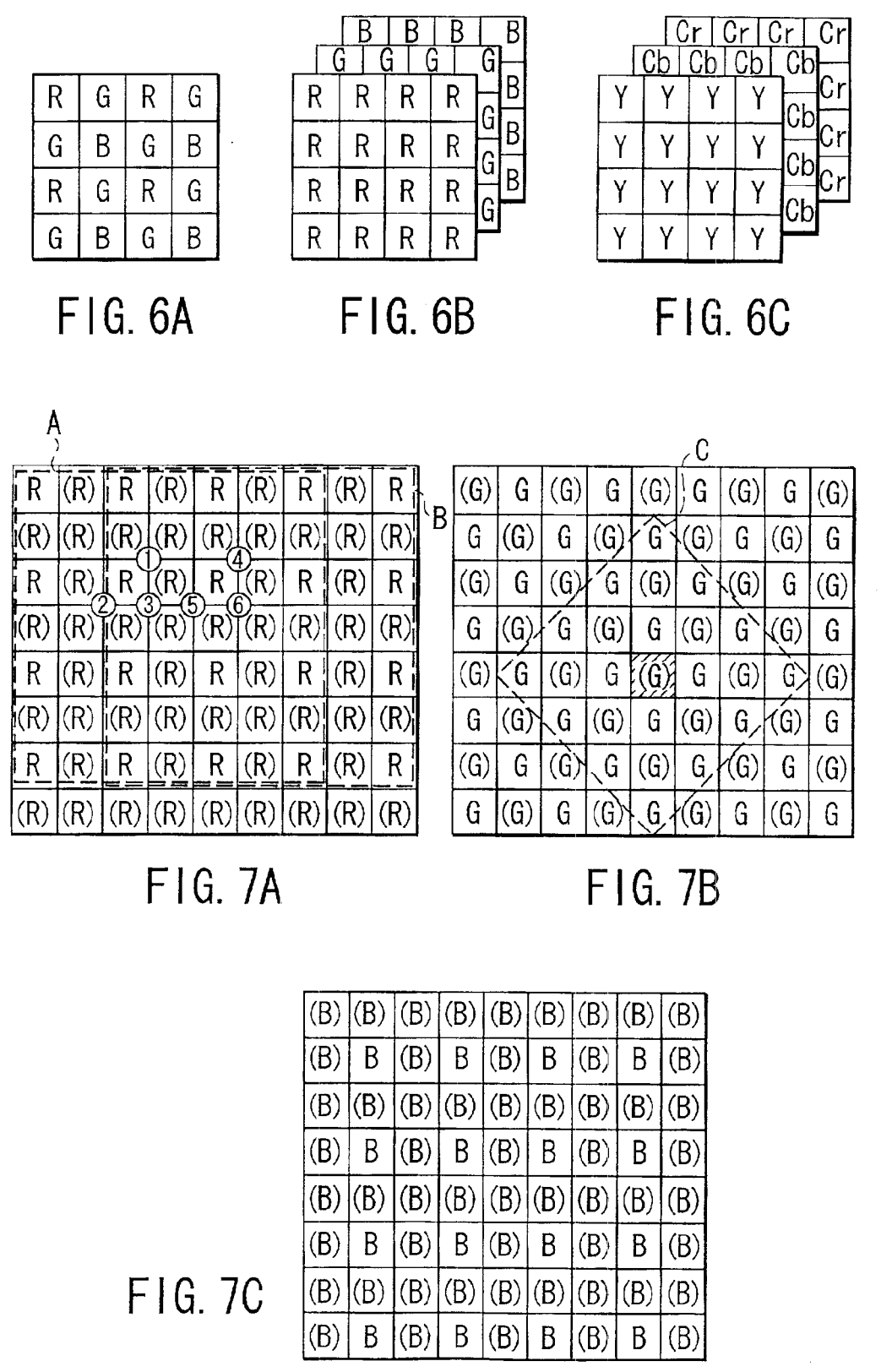

FIGS. 6A to 6C are views for explaining pseudo 3-CCD processing by the RGB 3-CCD processing section 100 using interpolation calculation by an approximate expression using a higher-order polynomial.

As shown in FIG. 6A, a single image sensing element has a predetermined color layout of R (red), G (green), and B (blue) in units of pixels. One pixel corresponds to one color. In the present invention, using interpolation by an approximate expression using a higher-order polynomial, a red interpolation value is embedded in pixels without red color information, a green interpolation value is embedded in pixels without green color information, and a blue interpolation value is embedded in pixels without blue color information, thereby implementing pseudo 3-CCD processing. This process is shown in FIG. 6B. The color space conversion section 103 replaces the pixel planes shown in FIG. 6B with pixel planes shown in FIG. 6C on the basis of relationships:

$$Y=aR+bG+cB$$

$$Cb=\alpha(B-Y)$$

$$Cr=\beta(R-Y).$$

This is conversion from RGB expression into Y–C expression.

FIGS. 7A to 7C are views for explaining the interpolation method for the R, G, and B colors. Referring to FIGS. 7A to 7C, each of (R), (G), and (B) represents that the color information is not present. FIG. 7A shows interpolation of R (red). In this case, R (red) color information at neighboring points ①, ②, and ③ having R (red) color information can be interpolated using data (16 R data) indicated by a broken line A in FIG. 7A. R (red) color information at points ④, ⑤, and ⑥ can be obtained on the basis of data indicated by a broken line B in FIG. 7A. Pieces of color information at all squares are obtained by such interpolation. For G (green) shown in FIG. 7B, since pixels having G data and pixels having no G data are alternated, for example, (G) data of a hatched pixel is obtained using 16 data represented by a broken line c. B (blue) shown in FIG. 7C has the same layout as that of R (red), so data at a no-pixel portion can be interpolated by the same procedure as that for R (red). In this case, data for 16 pixels (16 data are used for two-dimensional interpolation using a 3rd-order polynomial, as described above) are prepared as an interpolation coefficient table. Hence, a small table suffices as an interpolation coefficient table. In addition, since interpolation coefficients are given by the table, and no complex calculation is necessary, pseudo 3-CCD processing can be implemented using a small circuit.

FIGS. 8A to 8C are views for explaining another interpolation method for the R, G, and B colors. In the example shown in FIGS. 7A to 7C, to interpolate the R, G, and B colors, for, e.g., the R (red) region A shown in FIG. 7A, the interpolation value is obtained from 7×7 pixels (basically, a region containing 8×8 pixels is extracted). For G (green) shown in FIG. 7B, a rhombic region is set to obtain the interpolation value. When the interpolation value is obtained by the region setting method shown in FIGS. 7A to 7C, R (red) and B (blue) can use the same effective band, though the effective band of G (green) is different from that of the remaining colors. This interpolation method is therefore not preferable. To avoid this, all the R, G, and B colors are interpolated using 4×4 pixels. FIG. BA shows interpolation of R (red), FIG. BB shows interpolation of G (green), and FIG. 8C shows interpolation of B (blue).

For example, referring to FIG. 8A, when 4×4 pixels are extracted, the extracted region has at least four R (red) pixels (i.e., four data). Using the four data, the interpolation value at a position ○ shown in FIG. 8A is obtained by an approximate expression using a 3rd-order polynomial. G (green) and B (blue) are also interpolated according to the same procedure as that for R (red). Since the frequency band changes depending on the position and interpolation coefficient, pixel data is corrected by a correction coefficient corresponding to the pixel position, as shown in FIGS. 8A to 8C. Thus in this embodiment, since the number of interpolation pixels can be decreased, and the R, G, and B color data are generated using the same interpolation coefficient on the basis of same 4×4 pixels, the same effective band can be used.

FIG. 9 is a view showing for explaining still another interpolation method for the G (green) plane. Referring to FIG. 9, a square region is extracted, like R (red) or B (blue), instead of extracting a rhombic region as shown in FIG. 7B. Referring to FIG. 9, for example, data interpolated by (G) and that interpolated by [G] are added to obtain an interpolation value. This makes it possible to generate G (green) data using the same interpolation coefficient in the same pixel region as that of R (red) or B (blue), so the same effective band can be used. In addition, since the number of pixels used for interpolation is larger than that of the example shown in FIGS. 8A to 8C, the accuracy increases.

As described above, according to the present invention, for a pixel having, e.g., R (red) pixel information of the R, G, and B color information, G (green) and B (blue) pixel values are obtained by interpolation by an approximate expression using a higher-order polynomial, and for a pixel having no R (red) color information, the pixel value is obtained by similar interpolation. With this interpolation by an approximate expression using a higher-order polynomial, a more accurate interpolation value can be obtained than the conventional, e.g., linear interpolation, so an inexpensive and high-quality electronic camera can be provided. As described with reference to FIG. 3, interpolation calculation is executed by looking up the interpolation coefficient table prepared in advance to avoid complex calculation. Hence, this allows high-speed processing and requires no high-performance arithmetic element.

[Format Conversion]

Figures 10A, 10B:
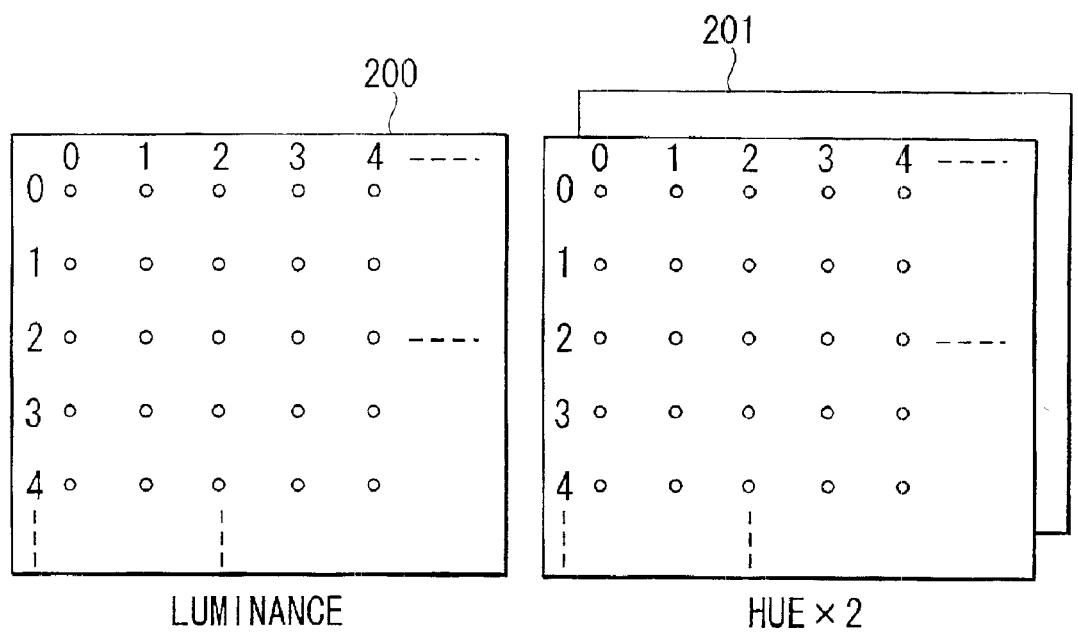
FIG. 10A is a view showing a luminance plane so as to explain image format conversion.
FIG. 10B is a view showing a hue plane so as to explain image format conversion.

FIGS. 10 and 10B are views for explaining image format conversion.

Assume that RGB data generated by the RGB 3-CCD processing section 100 is converted into luminance and hue (color difference) data by the color space conversion section 103, as described above, and a luminance plane 200 and hue planes 201 in the "444" format are obtained, as shown in FIGS. 10A and 10B. The format conversion section 101 thins pixel data from the hue plane 201 in the "444" format by format conversion according to sampling rate conversion to halve the number of pixels in the X direction, thereby obtaining hue data in the "422" format. Alternatively, the format conversion section 101 thins pixel data from the hue plane 201 in the "444", format to halve the number of pixels in the X direction and simultaneously halve the number of pixels in the Y direction, thereby obtaining a hue plane in the "420" format. In such format conversion, image data in a space without data must be generated by interpolation in accordance with a change in sampling phase. In this case, interpolation processing by the interpolation calculation circuit 90 is used to cubic-interpolate pixel data at a position without data.

[Enlargement/Reduction (Resize)]

Figure 11:
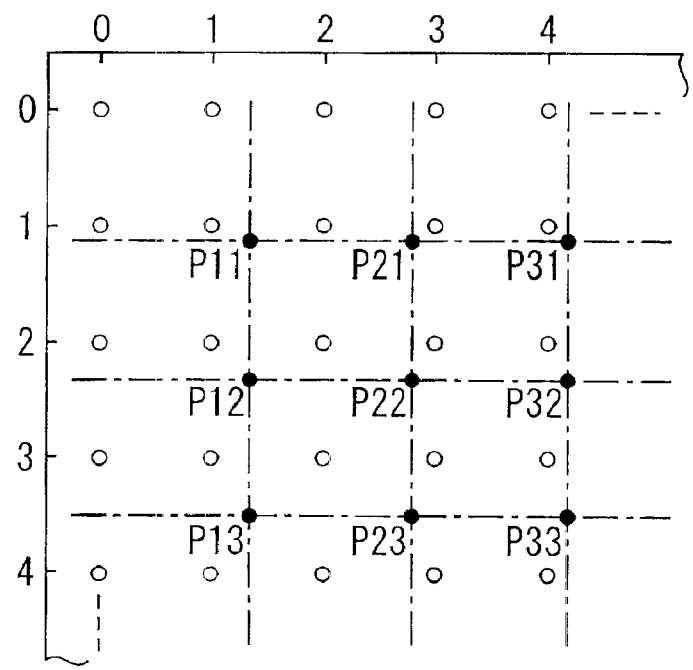
FIG. 11 is a view for explaining the concept of enlargement/reduction (resize) of an image.

FIG. 11 is a view for explaining the concept of enlargement/reduction (to be referred to as resize hereinafter) of an image.

Referring to FIG. 11, hollow dots represent pixels before resize, and solid dots (P11, P12, P13, P21, P22, . . . ) represents pixels after resize. As is apparent from FIG. 11, the layout pitch of pixels in the section of X-coordinates 0 to 4 changes between pixels represented by hollow dots and those represented by solid dots. More specifically, for the pixels represented by solid dots, the pitch is larger than the pixels represented by hollow dots, and the number of pixels is smaller. That is, FIG. 11 shows reduction of the image. The image is enlarged by a reverse procedure.

The enlargement/reduction processing section 102 changes the number of pixels in accordance with a given scale. At this time, interpolation processing by the interpolation calculation circuit 90 is used.

A detailed example of such image resize processing will be described below.

Figure 12:
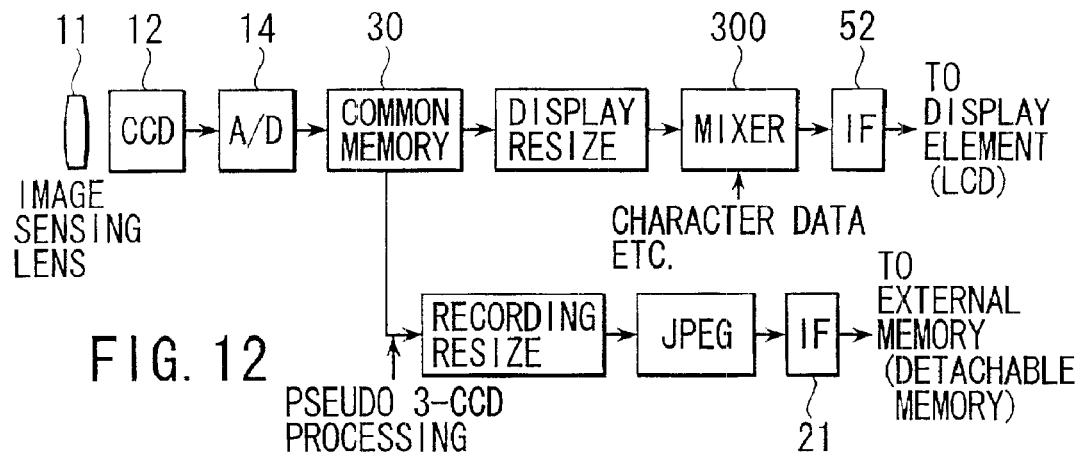
FIG. 12 is a view showing the flow of display and recording processing.

FIG. 12 is a view showing the flow of display and recording processing. Referring to FIG. 12, the optical image of an object, which has passed through the image sensing lens system 11, is photoelectrically converted by the CCD 12. The resultant electrical signal is converted into an analog image signal by image sensing circuit 13 (not shown in FIG. 12) and then into a digital image signal by the A/D converter 14. The digital image signal is temporarily stored in the internal memory (to be referred to as the "common memory" hereinafter) 30.

The digital image signal stored in the common memory 30 is supplied to two processing routes: display image processing and recording image processing. The display and recording image processing operations are normally performed as processing operations of enlarging or reducing the image (to be referred to as display resize and recording resize, respectively). In the present invention, the display resize and recording resize use interpolation processing (cubic interpolation processing, in this case) by an approximate expression using a higher-order polynomial, with which a high accuracy is obtained. An image having a desired number of pixels, which is obtained by this interpolation processing, is processed as follows. For display, for example, character data is added to the processed image data by a mixer 300, and the image data is displayed on the LCD 50 through the interface circuit (video output circuit) 52. For recording, the processed image data is compressed by the compression/expansion section 40 using, e.g., the JPEG scheme and recorded in the detachable memory 20 through the interface 21. One interpolation processing circuit can be shared for display and recording, or separate interpolation processing circuit capable of independently operating may be provided for high-speed processing.

Figure 13:
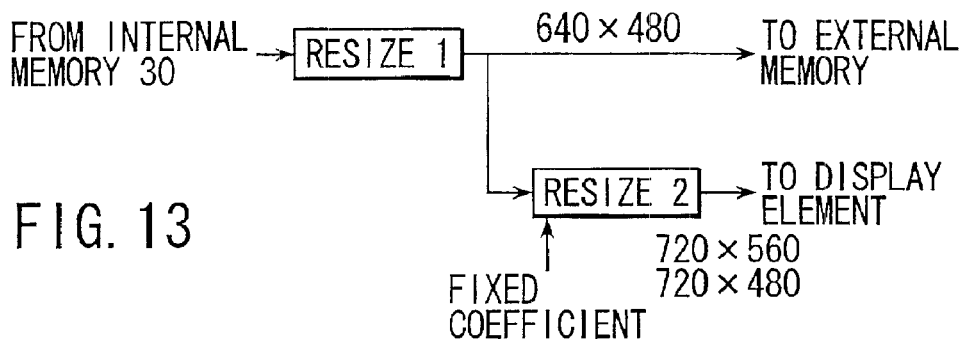
FIG. 13 is a view showing a modification of processing shown in FIG. 12.

FIG. 13 is a view showing a modification of processing shown in FIG. 12. In processing shown in FIG. 13, image information read out from the internal memory 30 is resized to an image having a number of pixels (e.g., 640×480 pixels) corresponding to desired recording image information (this processing is called resize 1). To do this, interpolation processing by an approximate expression using a higher-order polynomial according to the present invention is executed. This image is a recording image and therefore directly recorded in an external memory such as the detachable memory 20 through image compression by, e.g., JPEG.

When an image is displayed on the LCD 50, the number of pixels of the image is often different from 640×480 pixels in the above recording processing. Hence, the image must be resized for display (this processing is called resize 2).

At this time, the display image is preferably generated by interpolation processing by an approximate expression using a higher-order polynomial. The sizes of recording and display images are normally fixed to some extent. More specifically, the image size for recording is, e.g., the above-described 640×480 pixels, or 800×600 or 1,024×768 pixels for a higher image quality. For display, the above-described number of pixels is used, or the number of pixels can be equal to that for recording. Thus, the number of pixels for recording or display is often predetermined. To resize the image for display (resize 2), as shown in FIG. 13, the image can be resized using a coefficient (fixed coefficient) obtained by an approximate expression using a higher-order polynomial in advance to reduce the processing, instead of using interpolation processing by an approximate expression using a higher-order polynomial.

Figure 14:
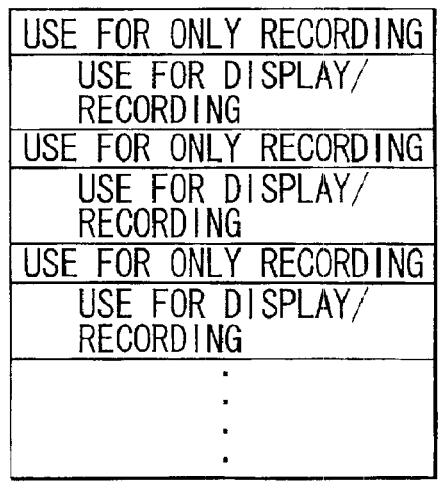
FIG. 14 is a view showing an interpolation coefficient table.

In the above description, interpolation processing is executed by an approximate expression using a higher-order polynomial. To reduce the processing, the fixed coefficient shown in FIG. 13 is preferably applied not only to only resize 2 but also to display resize and recording resize shown in FIG. 12 and resize 1 shown in FIG. 13. This is because the number of pixels of an image to be recorded or the number of pixels of an image to be displayed is predetermined in most cases. When a coefficient (fixed coefficient) obtained by an approximate expression using a higher-order polynomial in advance is used for resize instead of actually performing interpolation processing using a higher-order polynomial, processing can be reduced. This contributes to increasing the speed of image processing in the electronic camera and simplifying the image processing circuit. FIG. 14 is a view showing an interpolation coefficient table in this case. The interpolation coefficient table shown in FIG. 13 shows parts used for only recording and parts used for both display and recording. Because the data size for display is different from that for recording, only part of the interpolation coefficient table suffices for display, and the entire table need not be used, the interpolation coefficient table portion for recording is shared by the interpolation coefficient table for display. The interpolation coefficient table can be appropriately changed depending on the data sizes of display and recording images, and for example, parts used for only display may be prepared, unlike the example shown in FIG. 14.

Figure 15A:
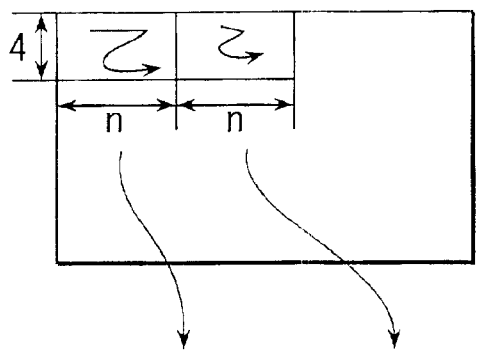
FIG. 15A is a view showing block data so as to explain handling of image data recorded in a common memory.
Figure 15C:
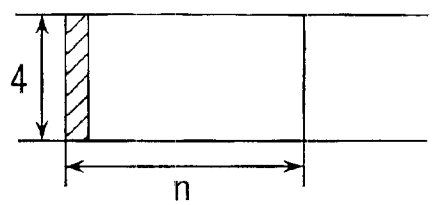
FIG. 15C is a view showing another example of the read of data to be interpolated so as to explain handling of image data recorded in the common memory.
Figure 15B:
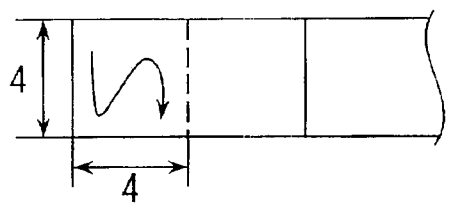
FIG. 15B is a view showing a read of data to be interpolated so as to explain handling of image data recorded in the common memory.

FIGS. 15A to 15C are views for explaining handling of image data recorded in a common memory. A case wherein interpolation (cubic interpolation) by an approximate expression using a 3rd-order polynomial is performed will be described. Normally, data is written in a memory in units of blocks. In this case, data is segmented into blocks in size corresponding to the data quantity. For example, as shown in FIG. 15A, data having a size of 4×n (for example, when n=8, one block=32 bytes) is set as block data.

In a data read, data each having a size of 4×4 are sequentially read out, as shown in FIG. 15B, and interpolation by an approximate expression using a two-dimensional 3rd-order polynomial is performed. In this case, the write or read data sequence can be appropriately changed in accordance with the order of the polynomial to be approximated. When a two-dimensional polynomial is used, data is written in units of 5×n blocks and read out in units of 5×5 blocks. Similarly, when the order increases, and a two-dimensional mth-order polynomial is used, data is written in units of (m+1)×n blocks and read out in units of (m+1)×(m+1) blocks and interpolated. In this case, the above-described interpolation coefficient table can be used. Interpolation in units of 4×4 data blocks has been described above However, the present invention is not limited to this, and an arbitrary 4×n data block (e.g., data of one column indicated by the hatched portion) can be used as representative data, and interpolation by an approximate expression using one-dimensional 3rd-order polynomial can be performed, as shown in FIG. 15C. Alternatively, data obtained by adding and averaging data of n columns in each row of a 4×n data block can be used, and interpolation can be performed by an approximate expression using a one-dimensional 3rd-order polynomial. This decreases the calculation amount.

Figure 16:
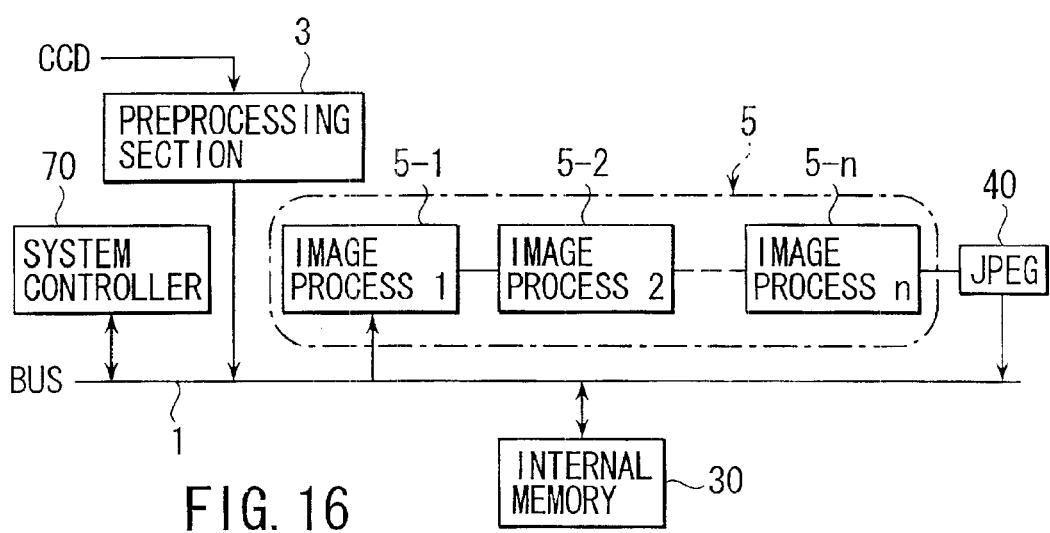
FIG. 16 is a block diagram showing the arrangement of pipeline processing.

Sequentially executing the above processing operations is very time-consuming, and it is not practical to individually execute them. The time can be shortened by continuously performing time-consuming operations as pipeline processing. FIG. 16 is a block diagram showing the arrangement of pipeline processing. Referring to FIG. 16, the system controller 70, preprocessing section 3, common memory 30, image processing section 5, and compression/expansion circuit 40 (described as a JPEG compression circuit herein) are connected through a bus 1. The preprocessing section 3 includes the image sensing circuit 13 and A/D converter 14 shown in FIG. 1. The image processing section 5 is included in the system controller 70 to mainly perform processing for image reduction or enlargement. In this case, basically, since this image processing is very time-consuming, the processes are divided into multiple stages (n stages in FIG. 16), as shown in FIG. 16, and the individual processes are parallelly executed as pipeline processing. This shortens the processing time.

According to above-described image processing for resize, the image quality can be improved for both display and recording. Since interpolation is performed under a condition according to the resolution for display or recording, processing can be efficiently performed at a higher speed. When the interpolation condition is defined in units of precision or data, more appropriate and effective image processing can be implemented.

When dedicated interpolation means are provided for display and recording, respectively, the processing speed can be increased. In addition, when the interpolation value is calculated on the basis of interpolation coefficient information, a highly accurate interpolation result can be obtained at a high speed with a simple circuit arrangement without any complex calculation. When the interpolation coefficient information is partially shared by display and recording, the storage area can be saved. When a sensed image (original data of a sensed image) is shared by display and recording, the storage area can be further saved.

[Efficient Use of Memory]

In the electronic camera, various intermediate image data as results of various image processing operations performed in the process until the sensed image is finally displayed or recorded are wholly stored in the internal memory 30, as needed.

Intermediate image data include image sensing data: image data output from the A/D converter 14 before image processing;

RGB data: image data obtained by RGB processing of the image sensing data;

YC data: image data obtained by YC processing of the RGB data;

processed image data: image data obtained by executing image processing such as enlargement or reduction for the YC data; and JPEG data: image data after the processed image data is compressed.

A large memory capacity is required to simultaneously store all the image data. As the image quality becomes high, the required memory capacity greatly increases. Hence, an increase in cost of the internal memory 30 poses a problem.

Figure 17A:
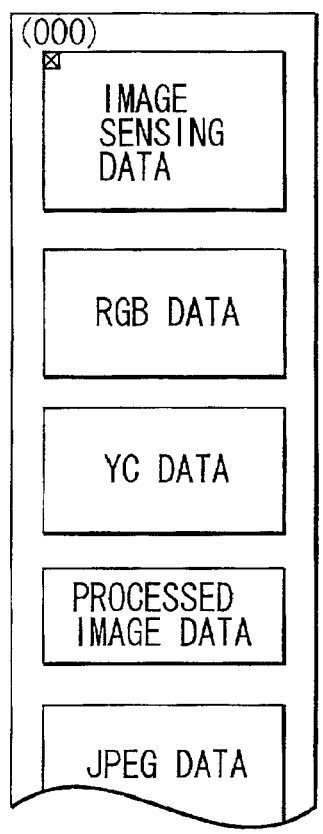
FIG. 17A is a view showing a conventional memory map for efficient use of a memory.
Figure 17B:
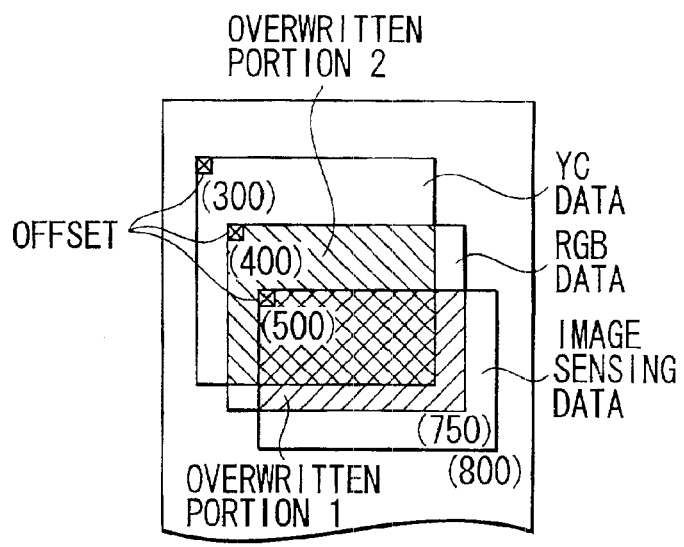
FIG. 17B is a view for explaining an example of an invention for efficient use of a memory.
Figure 17C:
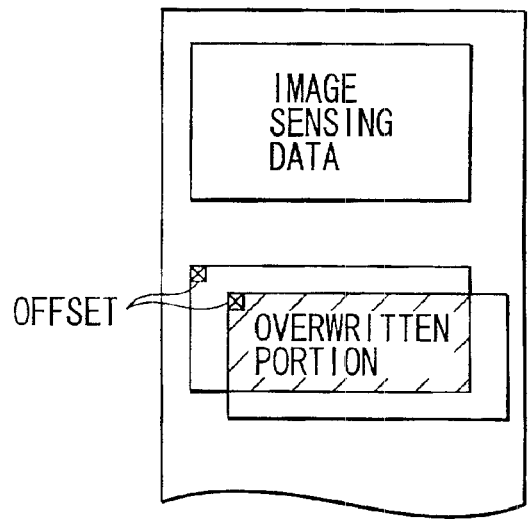
FIG. 17C is a view for explaining another example of the invention for efficient use of a memory.

An invention for efficient use of the memory in storing these data in the internal memory 30 will be described below with reference to FIGS. 17A to 17C. FIG. 17A is a view showing a conventional memory map, and FIGS. 17B and 17C are views showing memory maps of the present invention. Control for this operation is exclusively done by the system controller 70, and a description that the operation is controlled by the system controller 70 will be omitted.

As shown FIG. 17A, conventionally, each of image sensing data, RGB data, YC data, processed image data, and JPEG data is additionally recorded in a memory area immediately after the previous data.

FIG. 17B is a view for explaining memory management according to the present invention. In memory management of the present invention, data after image processing is partially overwritten on part of data before image processing, thereby realizing efficient use of the memory.

Generally, to write data in a memory area, data are sequentially written from the start address (e.g., "000"). In the present invention shown in FIG. 17B, instead of writing image sensing data from "000", the write start address is shifted from "000" by predetermined addresses in consideration of the quantity of image sensing data. For example, the write start and end addresses are set to "500", and "800". This address shifting operation is called "offset" in the present invention.

When RGB data is formed from the image sensing data, the write start address is set to "400", and the write end address is set to "750". When the RGB data is generated, the image sensing data is partially (overwritten portion 1) overwritten with the RGB data and lost. However, a capacity for 400 addresses from "400" to "800" suffices in the present invention, while 650 addresses=300+350 are required in the prior art. In a similar manner, for example, YC data is written from, e.g., address "300", processed image data is written from address "200", and JPEG data is written from address "100". Since processed data is overwritten on data unnecessary for process, the required memory capacity can be decreased.

That is, in the present invention, only a memory capacity as a sum of a memory capacity capable of storing an image in the largest data quantity in the image to be processed and a memory capacity necessary for the overwriting operation is required as a memory capacity. Hence, even when a high image quality is required for the electronic camera, and the data quantity of image information increases, the memory capacity only need increase by a capacity for the improvement in image quality. The memory capacity need not greatly increase in accordance with improvement in image quality, unlike the prior art.

The reason why memory management as shown in FIG. 17B is possible will be briefly described by exemplifying generation of RGB data from image sensing data.

In generating RGB data from image sensing data, it is very inefficient to load the entire image sensing data and then process it at once. In the embodiment of the present invention, data is read out from the internal memory 30 in units of blocks (e.g., 8×8 bytes or 32×32 bytes) and converted into RGB data, and the RGB data is written in the area next to the image sensing data. Similarly, data of the next block is read out and converted into RGB data, and the RGB data is written next to the previously processed data.

In the present invention, to write RGB data generated from image sensing data, an address obtained by adding the offset amount to the start address of the image sensing data is given as a start address, and the RGB data is overwritten on the image sensing data. In this case, the offset amount is determined such that the entire RGB data can be generated without being overwritten on unprocessed image sensing data. This offset amount can be easily known by calculating the expected data quantity after image processing. The same operation as described above is performed for a write (overwrite) of another data after image processing.

Finally, only data for display or JPEG data for recording after image processing remains on the memory as complete data. However, the remaining intermediate image data are unnecessary, and therefore, no problem is posed.

If erasure of intermediate image data poses a problem, and for example, if image sensing data need be left without any omission because of the convenience for processing, e.g., when the same image sensing data is to be used for display and recording processing, the following measure is taken.

As shown in FIG. 17C, the image sensing data to be left is saved and stored in a special memory area such that it is not overwritten. This special memory area can be used as the memory area 31 for interpolation by an approximate expression using a higher-order polynomial of 3rd-order or more.

According to the above-described management method, the internal memory 30 can be effectively used, and the required memory capacity is suppressed. For this reason, an increase in cost of the memory 30 can be suppressed.

[Execution Control 1 of Cubic Interpolation Calculation Processing]

A preferred embodiment of electronic camera operation control according to the present invention will be described next. In this embodiment, execution of cubic interpolation calculation processing is controlled in consideration of the operation of the electronic camera in automatic focusing (AF) and automatic exposure (AE).

Figure 18A:
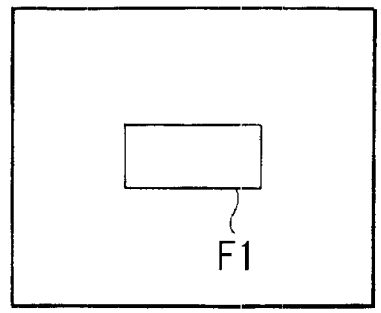
FIG. 18A is a view showing the view angle and distance measuring area so as to explain the concept of automatic focusing (AF)
Figure 18B:
FIG. 18B is a view showing the flow of AF evaluation value generation by a filter for contrast extraction so as to explain the concept of automatic focusing (AF)
Figure 18C:
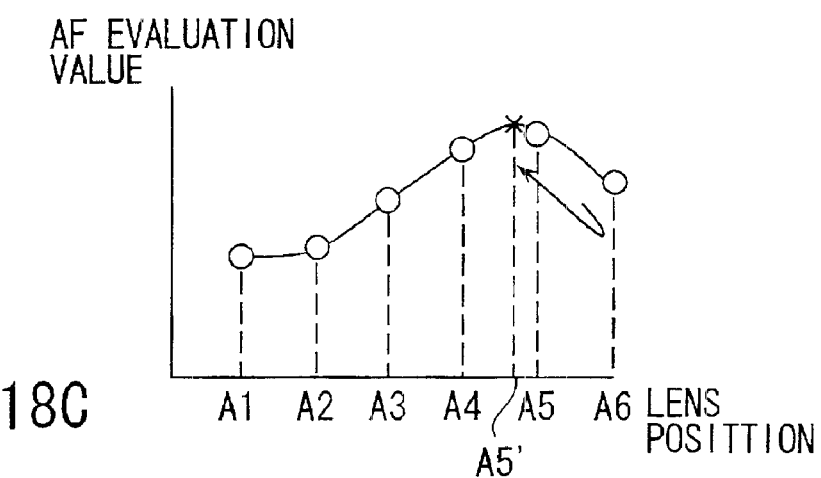
FIG. 18C is a graph showing the relationship between the lens position and the AF evaluation value so as to explain the concept of automatic focusing (AF)

FIGS. 18A to 18C are views for explaining the concept of automatic focusing (AF). FIG. 18A is a view showing the view angle and an area F1 called a distance measuring area used to measure the distance from the object. As shown in FIG. 18B, image sensing data is passed through a filter for extracting contrast. While sequentially shifting the lens position, output values from the filter are sequentially added to generate an AF evaluation value. The lens position when the AF evaluation value is maximized corresponds to the in-focus position. FIG. 18C is a graph showing the relationship between the lens position and the AF evaluation value. To obtain a focus position, the AF evaluation value is measured for each of a plurality of lens positions (A1, A2, . . . ) In the example shown in FIG. 18C, a position A5' slightly retreated from a lens position A5 with the largest AF evaluation value is the in-focus position.

Figure 19:
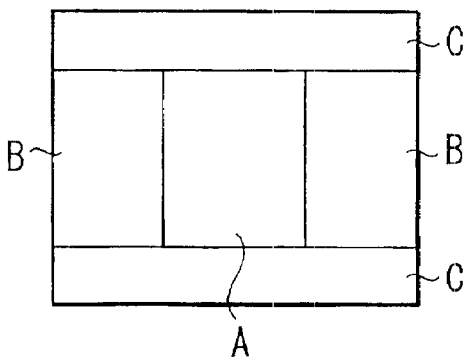
FIG. 19 is a view for explaining the concept of automatic exposure (AE)

FIG. 19 is a view for explaining the concept of automatic exposure (AE). As shown in FIG. 19, an image area is segmented into three areas A, B, and C. Of these segmented areas, basically, the segmented area located at the center can be regarded as an image with a high degree of importance. For the segmented areas, weighting is calculated using coefficients k1, k2, and k3 (k1>k2>k3) corresponding to the area types, and the following average of sum is calculated.

$$\text{Evaluation value} = \Sigma(k1A + k2B + k3C)/\Sigma ki$$

An appropriate exposure value is obtained on the basis of the evaluation value and F-number.

Figure 20:
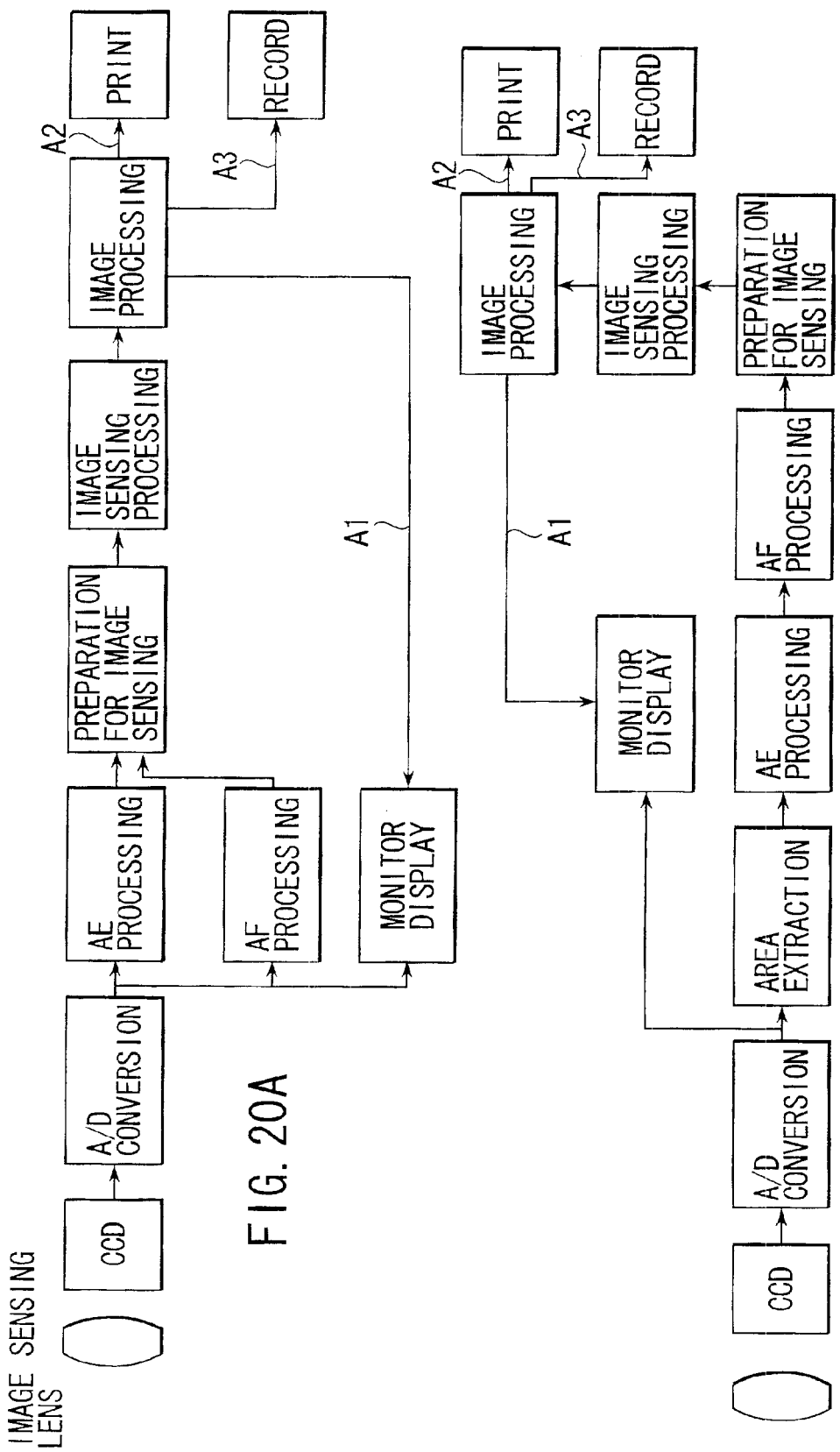
FIG. 20A is a view for explaining an example of the basic operation of the electronic camera.
FIG. 20B is a view for explaining another example of the basic operation of the electronic camera.

FIGS. 20A and 20B are views for explaining the basic operation of the electronic camera.

As shown in FIG. 20A, an object image from the image sensing lens is photoelectrically converted by the image sensing element (CCD) 12 and converted into a digital signal by the A/D converter 14. On the basis of this digital signal, the above-described AF processing and AE processing are performed as image sensing preprocessing. Next, predetermined image sensing conditions are set by the operator, and preparation for image sensing is done. In execution control of this embodiment, cubic interpolation calculation processing (to be referred to as cubic interpolation hereinafter) by the interpolation calculation section 90 is performed for neither the monitor image displayed on the LCD 50 nor image data subjected to AE processing and AF processing.

When the operator operates the operation section 73 to issue an image sensing instruction, the image data of the object image that has undergone AF processing and AE processing is received and subjected to image processing later. During this image sensing processing as well, cubic interpolation processing is not performed. As described above, priority is given to processing time until image sensing is ended.

In image processing after image sensing processing, an electronic image (sensed image) is formed from the received object image. Cubic interpolation is applied to such image processing.

More specifically, cubic interpolation is applied to image processing of enlarging or reducing the sensed image. A high-quality sensed image obtained on the basis of this interpolation processing displayed on the image display LCD 50 (indicated by an arrow A1).

The high-quality sensed image obtained on the basis of cubic interpolation is output to the printer unit (indicated by an arrow A2). The high-quality sensed image is output through the interface 21 to the detachable memory 20 connected to the card slot 22 and recorded in the detachable memory 20 (indicated by an arrow A3). When cubic interpolation is performed for the sensed image, a high-quality image can be obtained.

FIG. 20B is a view showing area extraction processing for AE processing and AF processing. In this operation, data in a predetermined area is read out from digital image data output from the A/D converter 14, and AE processing and AF processing are executed for the readout data. Since this decreases the quantity of data to be processed, the processing time becomes shorter than that in FIG. 20A, and the operation load of the electronic camera is reduced. Processing to which cubic interpolation is applied is the same as in FIG. 20A.

According to this embodiment, cubic interpolation is performed after AE processing, AF processing, and image sensing processing for which priority is given not to the image quality but to the processing speed. That is, cubic interpolation with a relatively heavy processing load is limitedly performed. This can prevent, e.g., the interval of image sensing operation as the basic operation of the electronic camera from being large to result in inconvenience, or the performance in the continuous image sensing mode from degrading. An increase in power consumption is also prevented.

[Execution Control 2 of Cubic Interpolation Calculation Processing]

In execution control 2 of cubic interpolation calculation processing, it is determined in accordance with the contents of mode setting by the operator whether cubic interpolation calculation processing is to be applied.

Figure 21:
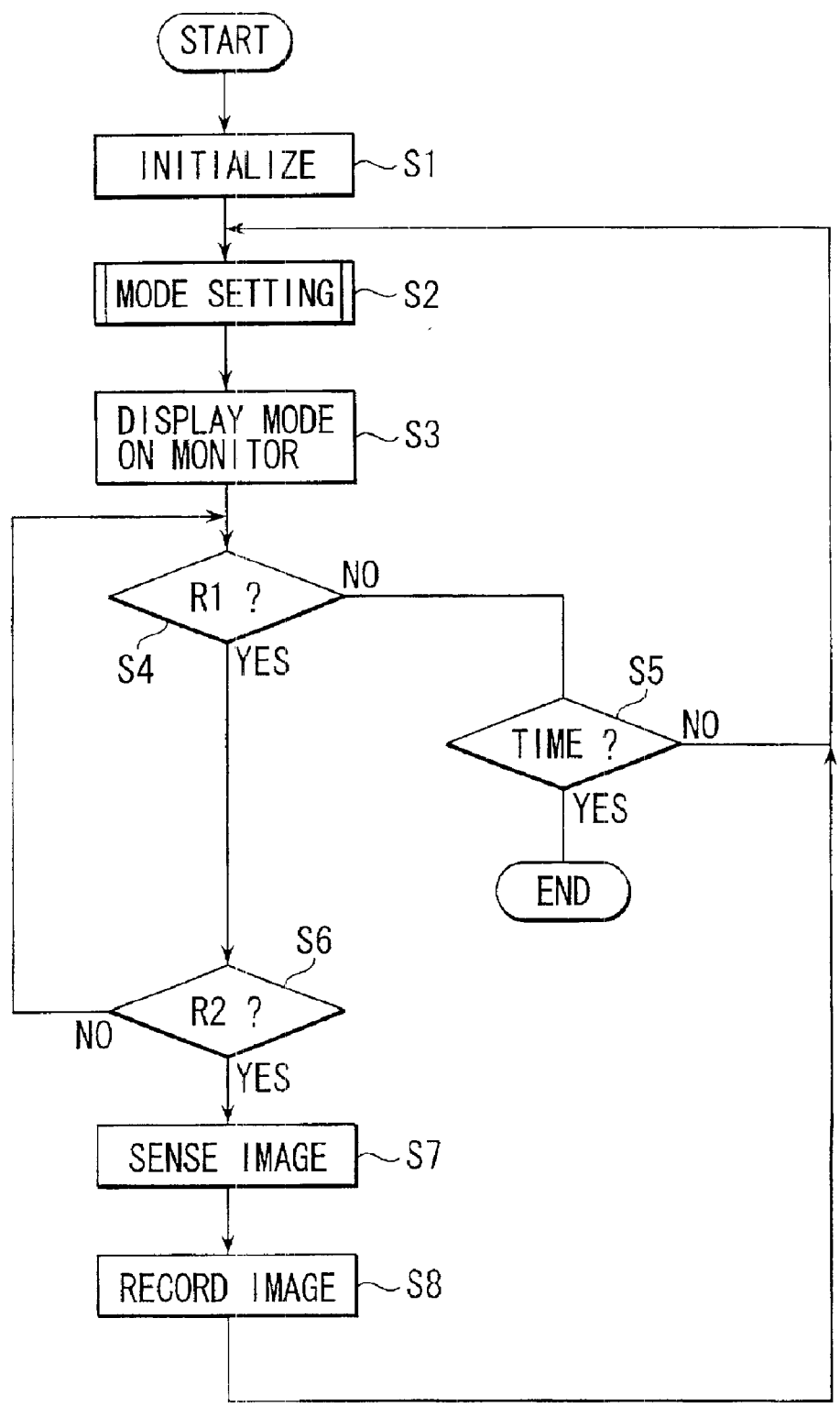
FIG. 21 is a flow chart showing the operation of the electronic camera in image sensing.

FIG. 21 is a view showing the operation of the electronic camera in image sensing. First, in step S1, the entire electronic camera is initialized. Various modes are set by the operator in step S2. Settable modes include the image sensing mode and image quality mode. On the basis of the operation of the operation section 73, the set contents are displayed on the mode LCD 72.

In step S2, a through image is displayed on the monitor. The operator directs the electronic camera to an object through a viewfinder (not shown), determines the composition, and performs the image sensing operation, i.e., the release operation.

It is determined whether the first release operation is performed (step S4). If NO in step S4, after the non-operation time exceeds a predetermined value (step S5), the camera image sensing operation is ended to suppress power consumption.

After the first release operation, it is determined whether the second release operation is performed (step S6). If YES in step S6, the flow advances to step S7 to execute image sensing processing.

In image sensing processing in step S7, the object image obtained through the image sensing element 12, image sensing circuit 13, and A/D converter 14 is received as a sensed image, and the flow advances to step SB to record the image.

In image recording in step S8, the sensed image is compressed by the compression/expansion circuit 40 and written in the detachable memory 20 through the interface 21.

Figure 22:
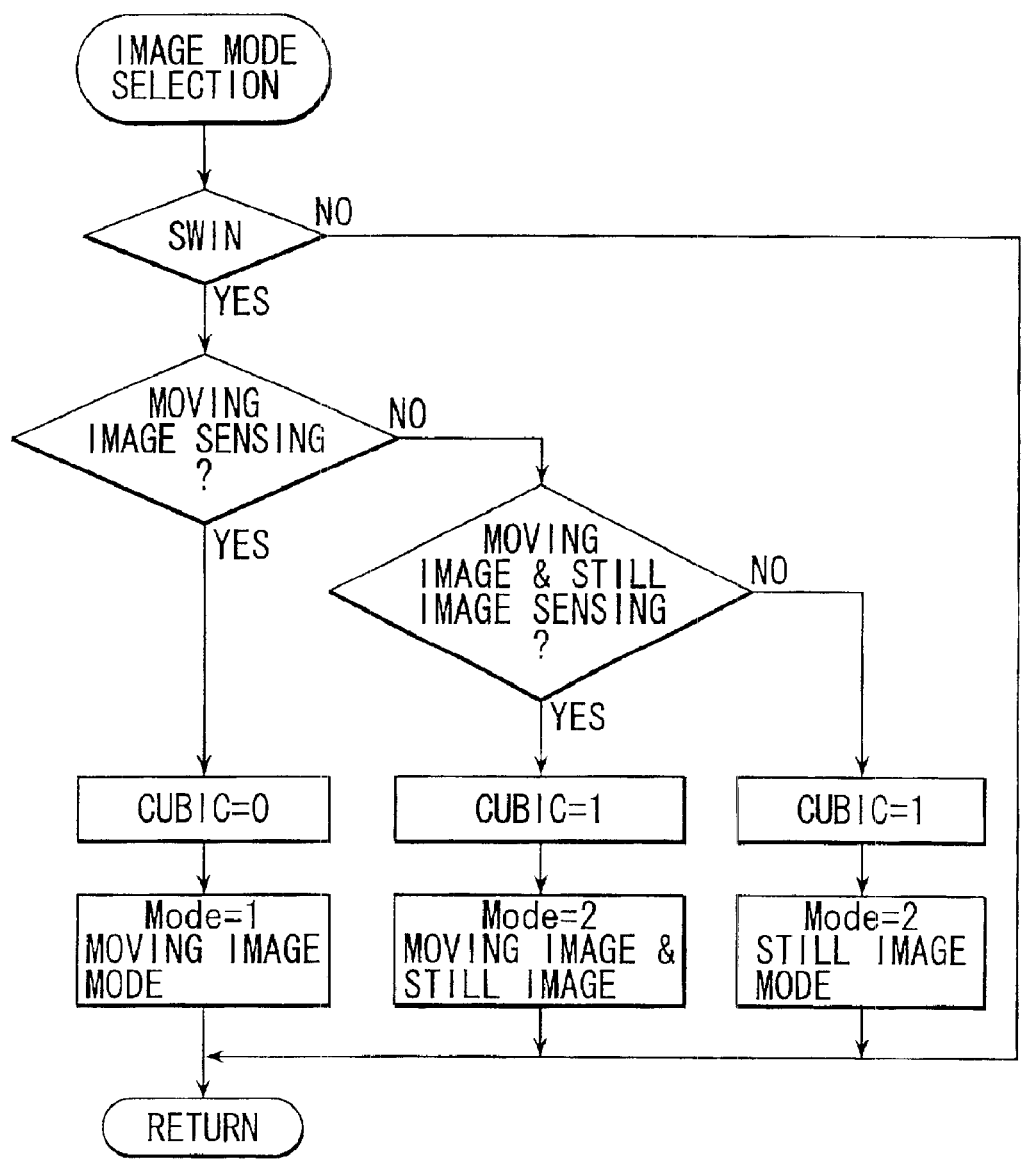
FIG. 22 is a flow chart showing processing of enabling/disabling application of cubic interpolation processing in accordance with setting of the image sensing mode.

FIG. 22 is a flow chart showing processing of enabling/disabling application of cubic interpolation processing in accordance with setting of the image sensing mode.

Mode setting (SW IN) by the operation section 73 corresponds to mode setting step S2 in FIG. 21. If the set contents represent the "moving image" mode, "CUBIC=0", i.e., cubic interpolation processing by the interpolation calculation circuit 90 is disabled. When the "moving image & still image sensing" mode is set, "CUBIC=1", i.e., the interpolation processing is enabled. In the "still image sensing" mode as well, "CUBIC=1", i.e., cubic interpolation processing is enabled.

When cubic interpolation processing is automatically enabled/disabled in accordance with setting of the image sensing mode, cubic interpolation is disabled when it is unnecessary, thereby avoiding load on the operation of the electronic camera system. Since cubic interpolation is performed only when it is necessary, a desired high-quality sensed image can be obtained. Such automatic selection does not require any special operation by the operator.

Figures 23, 24:
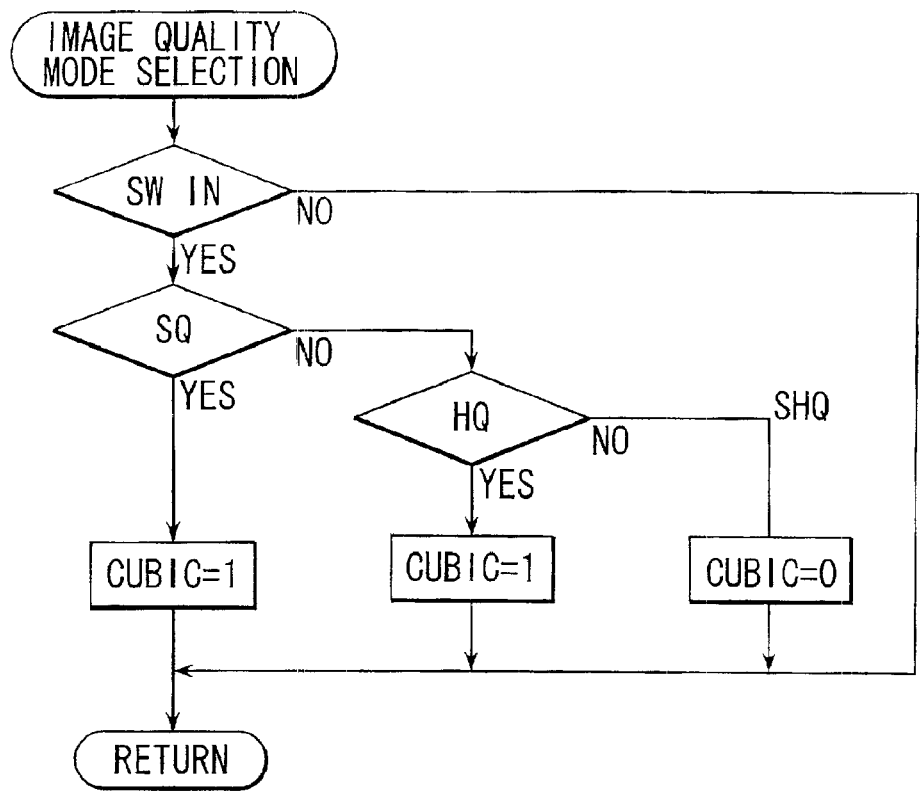
FIG. 23 is a flow chart showing processing of enabling/disabling application of cubic interpolation processing in accordance with setting of the image quality mode in enlarging/reducing an image.
FIG. 24 is a view showing processing of enabling/disabling application of cubic interpolation processing in accordance with detailed settings of the image sensing mode.

FIG. 23 is a flow chart showing processing of enabling/disabling application of cubic interpolation processing in accordance with setting of the image quality mode in enlarging/reducing an image.

The image quality modes include "SQ (Standard Quality)", "HQ (High Quality)", and "SHQ (Super High Quality)".

Of these mode, for an image sensed in the "SHQ" mode, cubic interpolation processing is unnecessary because the image size is fixed. On the other hand, for an image sensed in the "SQ" or "HQ" mode, cubic interpolation processing is effectively performed in enlarging/reducing the image because the image size is variable. The numbers of input pixels have a relationship SHQ>HQ>SQ.

Mode setting (SW IN) by the operation section 73 shown in FIG. 23 corresponds to mode setting step S2 in FIG. 21. If the set contents represent the "SQ" mode, "CUBIC=1", i.e., cubic interpolation processing is performed in enlarging/reducing the image. In the "HQ" mode as well, "CUBIC=1", i.e., cubic interpolation processing is performed in enlarging/reducing the image. In the "SHQ" mode, "CUBIC=0", i.e., cubic interpolation processing is not performed in enlarging/reducing the image.

When cubic interpolation processing is automatically enabled/disabled in accordance with setting of the image quality mode, cubic interpolation is disabled when it is unnecessary, thereby avoiding load on the operation of the electronic camera system. Since cubic interpolation is performed only when it is necessary, a desired high-quality sensed image can be obtained. Such automatic selection does not require any special operation by the operator.

Whether cubic interpolation processing is to be performed may be selected in accordance with the combination of the image sensing mode and image quality mode. More specifically, in the moving image sensing mode, cubic interpolation processing is not performed. In the moving image & still image sensing mode and in the still image mode, cubic interpolation processing is performed only when the image quality mode is "SQ" or "HQ", and is not performed in the "SHQ" mode.

FIG. 24 is a view for explaining another embodiment.

In the above embodiment, whether cubic interpolation is to be performed is automatically selected in accordance with setting of the image sensing mode, sensing of the image quality mode, or a combination of setting of two modes. In another embodiment, whether cubic interpolation is to be performed is set in accordance with detailed settings of the image sensing mode.

For example, as shown in FIG. 24, conditions are more finely classified on the basis of "drive" as detailed settings of the image sensing mode. More specifically, whether cubic interpolation processing is to be performed is automatically selected in accordance with, in the moving image sensing mode, setting of the "standard" mode or "stop motion" mode, and in the still image sensing mode, setting of the "single image sensing" mode or "continuous image sensing" mode.

In this example, cubic interpolation processing is performed in the "SQ" and "HQ" modes of the "single image sensing mode of still image sensing", the "HQ" mode of the "continuous image sensing mode of still image sensing", and the "HQ" mode of the "moving image & still image sensing mode".

As is apparent from this embodiment, whether application of cubic interpolation processing is enabled/disabled can be automatically selected in accordance with contents of more detailed mode setting. That is, cubic interpolation processing can be limitedly executed only under an appropriate condition regardless of conditions of the above-described mode settings.

According to the electronic camera of this embodiment, whether cubic interpolation processing is to be performed is automatically selected only by setting the image sensing mode and image quality mode. For this reason, no special operation by the operator is required to result in convenience, and an image having a desired image quality can be sensed in accordance with the mode.

The present invention is not limited to the above embodiments. In the above embodiments, only an example of a one-dimensional 3rd-order polynomial has been described as an approximate expression. However, the polynomial can be extended to a polynomial of 4th- or higher order. Interpolation by a multi-dimensional polynomial more than a two-dimensional polynomial is also possible. If not an approximate expression by a polynomial but a more accurate approximate expression using another appropriate function (e.g., an exponential function) is obtained, it is very effective to use the approximate expression and give the interpolation coefficient as a table.

Various changes and modifications can be made without departing from the spirit and scope of the present invention.

As has been described above, according to the present invention, an electronic camera capable of performing high-quality image processing with a simple arrangement without adding dedicated hardware can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera comprising:
   an image sensing unit for electronically sensing an object image and outputting image data of the object image;
   a memory unit for storing the image data output from said image sensing unit;
   an image processing unit for performing predetermined image processing based on the image data stored in said memory unit;
   an interpolation calculation circuit for interpolating a pixel whose data is not present in the image data after said image processing by said image processing unit by interpolation calculation based on an approximate expression including a polynomial of at least 3rd-order, and writing the image data after interpolation in said memory unit, said interpolation calculation circuit comprising:
     a calculation section for calculating an interpolation position of a pixel;
     an interpolation coefficient table which includes a plurality of interpolation coefficients;
     a correction section for correcting the interpolation position so as to correspond to one of the interpolation coefficients; and
     an interpolation calculation section for interpolating the pixel using the interpolation coefficient for the corrected interpolation position;
   a display unit for displaying the image data after interpolation; and
   a recording unit for recording the image data after interpolation on a recording medium.

2. A camera according to claim 1, further comprising a compression/expansion unit for at least one of compressing the image data after image processing and expanding the image data rear out from said recording unit.

3. A camera according to claim 1, wherein the interpolation calculation is a convolution calculation based on an approximate expression including a 3rd-order polynomial.

4. A camera according to claim 1, wherein said memory unit has a memory area dedicated for the interpolation calculation by said interpolation calculation circuit.

5. A camera according to claim 1, further comprising a dedicated memory unit used for the interpolation calculation by said interpolation calculation circuit.

6. A camera according to claim 1, wherein said image sensing unit comprises a single image sensing element to which an optical filter having an RGB color coating is attached.

7. A camera according to claim 6,
   further comprising a color separation unit for separating pixels in units of RGB color components based on a form of the color coating of said image sensing element to generate a plurality of pixel planes of the RGB color components from one pixel plane, and
   wherein said interpolation calculation circuit interpolates pixel data which is not present in the pixel planes of the RGB color components.

8. A camera according to claim 1, wherein the image processing includes enlargement and reduction of an image, and
   wherein said interpolation calculation circuit interpolates pixel data which is not present in the enlarged or reduced image.

9. A camera according to claim 8, wherein the enlargement/reduction image processing is individually performed for a display image to be supplied to said display unit and a recording image to be supplied to said recording unit.

10. A camera according to claim 6, wherein the image processing includes thinning of predetermined pixels and format conversion based on a sum of the predetermined pixels, and
    wherein said interpolation calculation circuit interpolates pixel data which is not present in the image after the format conversion.

11. A camera according to claim 1, further comprising an address control unit for controlling a write address in writing the image data processed by said image processing unit in said memory unit,
    wherein said address control unit overwrites a part of image data which has already been written.

12. A camera according to claim 11, wherein said address control unit controls an offset address from a start address of a storage area of said memory unit.

13. A camera according to claim 1, further comprising at least one of an automatic focus control unit and an automatic exposure unit, and
    wherein said interpolation calculation circuit executes the interpolation calculation when said automatic focus control unit and said automatic exposure unit are in an inoperative state.

14. A camera according to claim 1, further comprising an image sensing mode setting unit for setting one of a plurality of image sensing modes, and wherein execution of the interpolation calculation by said interpolation calculation circuit is enabled and disabled based on the image sensing mode set by said image sensing mode setting unit.

15. A camera according to claim 14, wherein the image sensing modes comprise a still image sensing mode and a moving/still image sensing mode, and wherein the interpolation calculation by said interpolation calculation circuit is performed only when one of the still image sensing mode and the moving/still image sensing mode is set.

16. A camera according to claim 1, further comprising an image quality mode setting unit for setting an image quality mode of the sensed image, and wherein the interpolation calculation by said interpolation calculation circuit is performed only when an image quality mode corresponding to a variable image size is set.

* * * * *